(No Model.)

A. L. GARFORD.
ELASTIC WHEEL TIRE.

No. 467,164. Patented Jan. 19, 1892.

Witnesses
H. J. Russ.
C. A. Skinkle.

Inventor
Arthur L. Garford
By his Attorney
Wm. A. Skinkle.

UNITED STATES PATENT OFFICE.

ARTHUR L. GARFORD, OF ELYRIA, OHIO.

ELASTIC WHEEL-TIRE.

SPECIFICATION forming part of Letters Patent No. 467,164, dated January 19, 1892.

Application filed May 14, 1891. Serial No. 392,670. (No model.)

*To all whom it may concern:*

Be it known that I, ARTHUR L. GARFORD, a citizen of the United States, residing at Elyria, in the county of Lorain and State of Ohio, have invented certain new and useful Improvements in Elastic Vehicle-Tires, of which the following is a specification, reference being had therein to the accompanying drawings.

My invention relates to hollow sectional inflated tires for vehicle-wheels. Its objects are to provide for the replacing of any sections therein that may become punctured or worn through and collapsed by reason of the escape of the confined inflating material.

It consists of a hollow tube, inclosed in which are several independent tubes with independent inflating nipples and valves, which project through the exterior tube and wheel-felly at suitable intervals around the circumference of the wheel. Some of the inclosed tubes are fully inflated, while others are only partially inflated or not inflated at all, and therefore collapsed or folded into the smallest possible space. These non-inflated or partially-inflated tubes are to be held in reserve and only used in the event of one of the fully-inflated tubes becoming punctured and collapsing, when one of the reserved tubes will be inflated or charged in any suitable manner and take the place of the accidentally-collapsed tube and completely refill the space within the outer or main cover.

In the accompanying drawings I show several forms of elastic wheel-tires embodying the features of my invention; but I do not mean to confine myself to any of these particular forms, for they may be varied through a wide range and easily modified or altered within the skill of a good mechanic to adapt them to peculiar circumstances or conditions without departing from the spirit of my invention, as set forth in the claims at the end of this specification.

Figure 1 shows an outer tube or protective covering A, which may or may not be airtight and may be made of rubber, rubber and canvas, leather, or any other flexible and enduring material suitable for the purpose. Within this tube are two air or fluid tight flexible tubes B, shown as fully inflated and expanded to their full sectional area. These tubes B do not fill the outer tube, but leave an irregularly-shaped space, within which I place another air or fluid tight flexible tube C, that is doubled or folded upon itself in such a manner that the space in which it is confined is of much less sectional area than the tube C would occupy if it had room in which to expand to its greatest capacity. The tubes B are first inflated and expanded to their greatest capacity, and then the tube C is inflated so that it spreads itself into all of the remaining space within the protective tube A. The tube C is practically a reserved tube within the outer covering A, and if either of the tubes B should burst or become punctured and collapse the tube C could be further inflated until expanded to its full capacity and take up or fill the space within the outer covering made vacant by the collapsed tube B. The tubes B and C would preferably be made of rubber, or rubber and canvas; but any material that would make a highly-flexible and air-tight tube would answer for this purpose.

Figure 1:
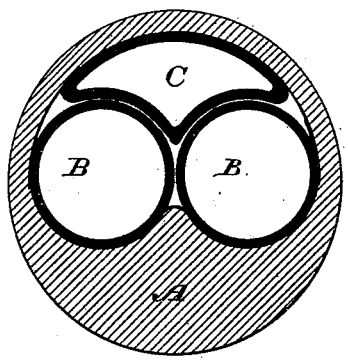
Figure 2:
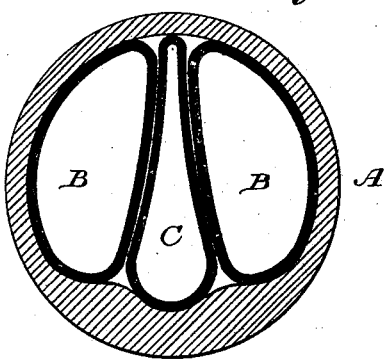
Fig. 2 shows an outer covering A, containing three irregularly-shaped tubes B B and C, all of which are inflated, but none of them distended to its greatest sectional area. In the event of any one of them becoming punctured and collapsing the other two would be further inflated and distended to fill the entire space within the outer tube A.
Figure 3:
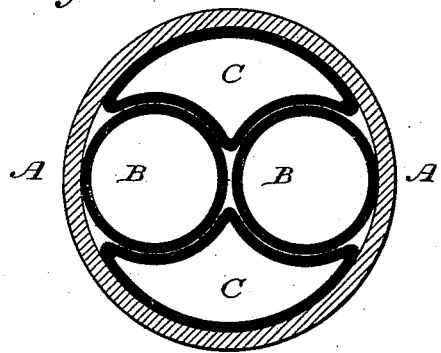
Fig. 3 shows two inflated and fully-distended round tubes B B and two inflated but partially-distended reserve tubes C within the outer protective tube or casing A.
Figure 4:
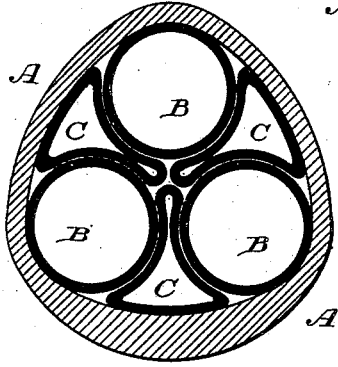
Fig. 4 shows three fully-inflated and distended tubes B and a similar number of reserve tubes C folded and packed away in the odd spaces between the tubes B and within the outer casing. This gives practically two complete sets of tubes within one outer casing, the same as shown in Fig. 3.
Figure 5:
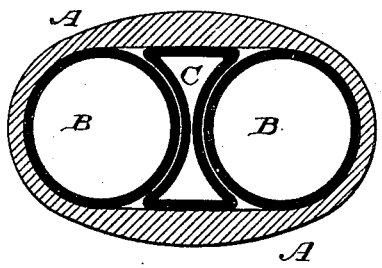
Fig. 5 shows two fully-distended tubes B and a single reserve tube C folded and stowed away between them.
Figure 6:
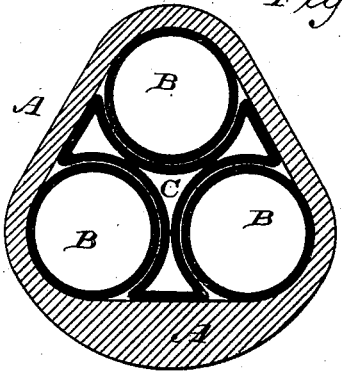

Fig. 6 shows three fully-distended tubes B with a single tube C so folded and arranged between them that it might replace any or all of the tubes B if they were to collapse. Of course each of the independent tubes contained in the outer casing A will have its independent check-valve and charging-tube, spout, or nozzle extending through the outer casing and the wheel felly or rim to which the tire is applied. These charging-tubes would be preferably located at equidistant points around the rim of the wheel, instead of being bunched or grouped together at one point, and they should be properly marked in some way for identification with the tubes to which they belong.

Having thus described my invention, what I claim as new and useful, and desire to secure by Letters Patent, is—

1. In an elastic tire for vehicles, the combination of a flexible outer tube or protective casing within which are several independent air-tight tubes, some of which are inflated and expanded to their full capacity, while that or those remaining may be inflated and partially expanded to fill up the otherwise unoccupied spaces within the outer covering.

2. The combination of an outer tube or protective casing filled with several independent inflatable tubes, one or more of which are held in reserve to replace any of the others that may become injured and collapsed, substantially as hereinbefore set forth.

In testimony whereof I affix my signature in the presence of two witnesses.

ARTHUR L. GARFORD.

Witnesses:
 FRED NORTON SMITH,
 H. S. FOLLANSBEE.